United States Patent
Mizuuchi et al.

(10) Patent No.: US 7,826,500 B2
(45) Date of Patent: Nov. 2, 2010

(54) FIBER LASER AND OPTICAL DEVICE

(75) Inventors: Kiminori Mizuuchi, Osaka (JP);
Kazuhisa Yamamoto, Osaka (JP);
Hiroyuki Furuya, Nara (JP)

(73) Assignee: Panasonic Corporation, Osaka (JP)

( * ) Notice: Subject to any disclaimer, the term of this patent is extended or adjusted under 35 U.S.C. 154(b) by 150 days.

(21) Appl. No.: 12/065,067

(22) PCT Filed: Aug. 8, 2006

(86) PCT No.: PCT/JP2006/315672
§ 371 (c)(1),
(2), (4) Date: Feb. 27, 2008

(87) PCT Pub. No.: WO2007/026510
PCT Pub. Date: Mar. 8, 2007

(65) Prior Publication Data
US 2009/0279573 A1    Nov. 12, 2009

(30) Foreign Application Priority Data
Aug. 29, 2005 (JP) .............................. 2005-247105

(51) Int. Cl.
*H01S 3/30* (2006.01)
*H01S 3/10* (2006.01)
(52) U.S. Cl. ................. 372/6; 372/21; 372/22
(58) Field of Classification Search .......... 372/6, 372/21, 22
See application file for complete search history.

(56) References Cited

U.S. PATENT DOCUMENTS

| 4,198,115 A * | 4/1980 | Kaminow ................ 385/11 |
|---|---|---|
| 4,884,277 A | 11/1989 | Anthon et al. |
| 5,136,597 A | 8/1992 | Nightingale |
| 5,247,528 A | 9/1993 | Shinozaki et al. |
| 5,404,366 A | 4/1995 | Wakabayashi |
| 5,410,560 A | 4/1995 | Taira |
| 5,511,083 A | 4/1996 | D'Amato et al. |

(Continued)

FOREIGN PATENT DOCUMENTS

| JP | 2-7487 | 1/1990 |
|---|---|---|
| JP | 4-229672 | 8/1992 |
| JP | 5-119364 | 5/1993 |

(Continued)

OTHER PUBLICATIONS

International Search Report issued Sep. 12, 2006 in the International (PCT) Application of which the present application is the U.S. National Stage.

(Continued)

*Primary Examiner*—Armando Rodriguez
(74) *Attorney, Agent, or Firm*—Wenderoth, Lind & Ponack, L.L.P.

(57) ABSTRACT

A fiber laser and an optical device for controlling polarization and outputting single polarized light are provided in a simple structure. The fiber laser includes a solid-state laser fiber (3) doped with a rare earth element, a pump light source (1) for exciting the solid-state laser fiber, a reflective element (2) having wavelength dependency, and a wavelength conversion element (4) arranged at the output side of the solid-state laser fiber away from the reflective element at a specified distance along the solid-state laser fiber, in which an end face of the wavelength conversion element (4) is inclined to an optical axis.

25 Claims, 15 Drawing Sheets

U.S. PATENT DOCUMENTS

| | | | |
|---|---|---|---|
| 5,905,748 A | 5/1999 | Xie | |
| 5,943,350 A | 8/1999 | Shichijyo | |
| 5,966,391 A * | 10/1999 | Zediker et al. | 372/22 |
| 5,995,523 A | 11/1999 | Xie | |
| 6,764,183 B2 * | 7/2004 | Okazaki | 353/31 |
| 6,996,140 B2 * | 2/2006 | Waarts et al. | 372/21 |
| 2001/0050932 A1 | 12/2001 | Sonoda et al. | |
| 2004/0164309 A1 | 8/2004 | Okano et al. | |

FOREIGN PATENT DOCUMENTS

| | | |
|---|---|---|
| JP | 5-235457 | 9/1993 |
| JP | 5-323117 | 12/1993 |
| JP | 5-333210 | 12/1993 |
| JP | 6-102545 | 4/1994 |
| JP | 6-283791 | 10/1994 |
| JP | 6-302904 | 10/1994 |
| JP | 10-55005 | 2/1998 |
| JP | 11-501158 | 1/1999 |
| JP | 2000-513155 | 10/2000 |
| JP | 2000-305119 | 11/2000 |
| JP | 2001-264662 | 9/2001 |
| JP | 2001-311974 | 11/2001 |
| JP | 2002-107779 | 4/2002 |
| JP | 2002-111108 | 4/2002 |
| JP | 2002-204025 | 7/2002 |
| JP | 2003-121656 | 4/2003 |
| JP | 2003-258341 | 9/2003 |
| JP | 2003-344886 | 12/2003 |
| JP | 2004-186233 | 7/2004 |
| JP | 2005-159075 | 6/2005 |
| JP | 2005159075 * | 6/2005 |

OTHER PUBLICATIONS

K. Mizuuchi et al., "*3-W cw green generation at 34% efficiency by single-pass frequency-doubling in a bulk periodically poled Mg0: LiNb0, at room temperature*", May 22-27, 2005, Lasers and Electro-Optics, 2005. (CLEO). Conference on, vol. 3, pp. 2256-2258.

Patent Cooperation Treaty (PCT) International Preliminary Report on Patentability, issued Mar. 4, 2008 in International Application No. PCT/JP2006/315672.

Partial English translation of Chinese Office Action dated Oct. 16, 2009 in corresponding Chinese Patent Application No. 200680032116.7.

* cited by examiner

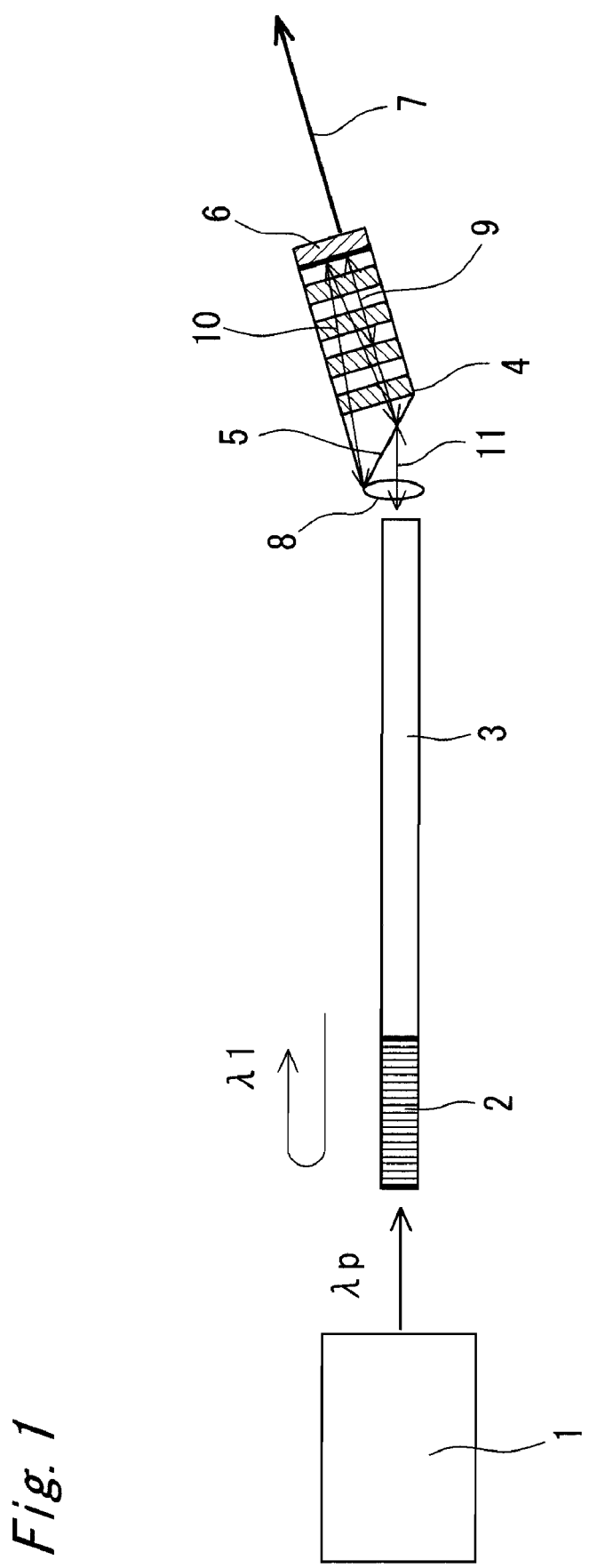

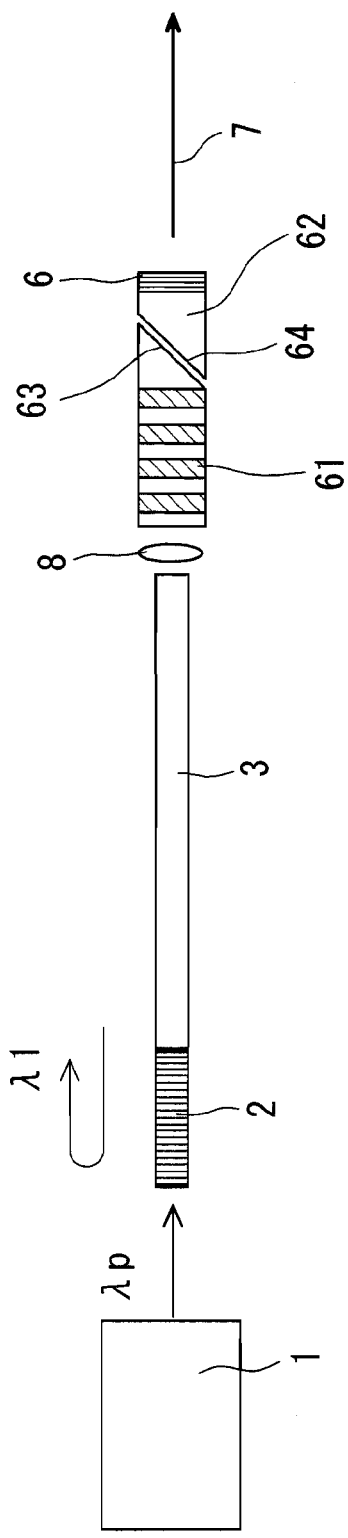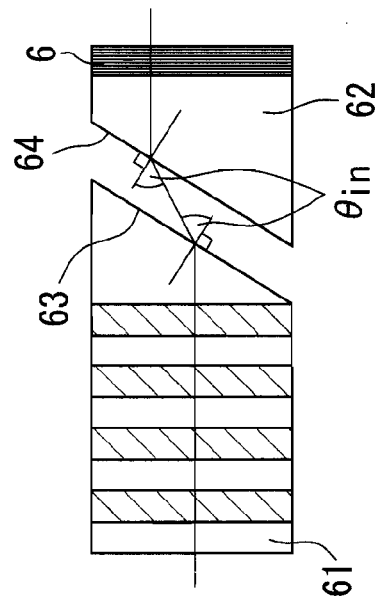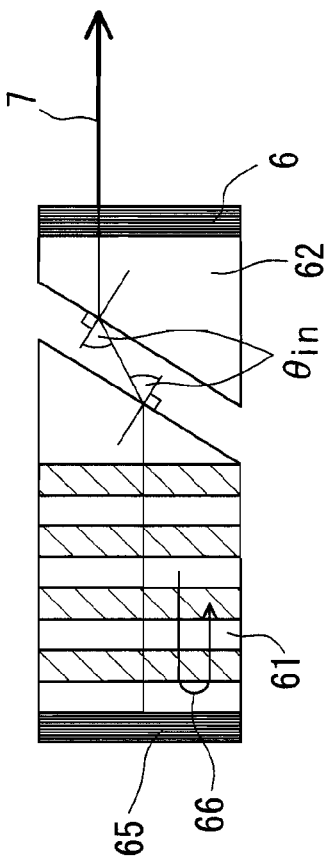
Fig. 6A
Fig. 6B
Fig. 6C

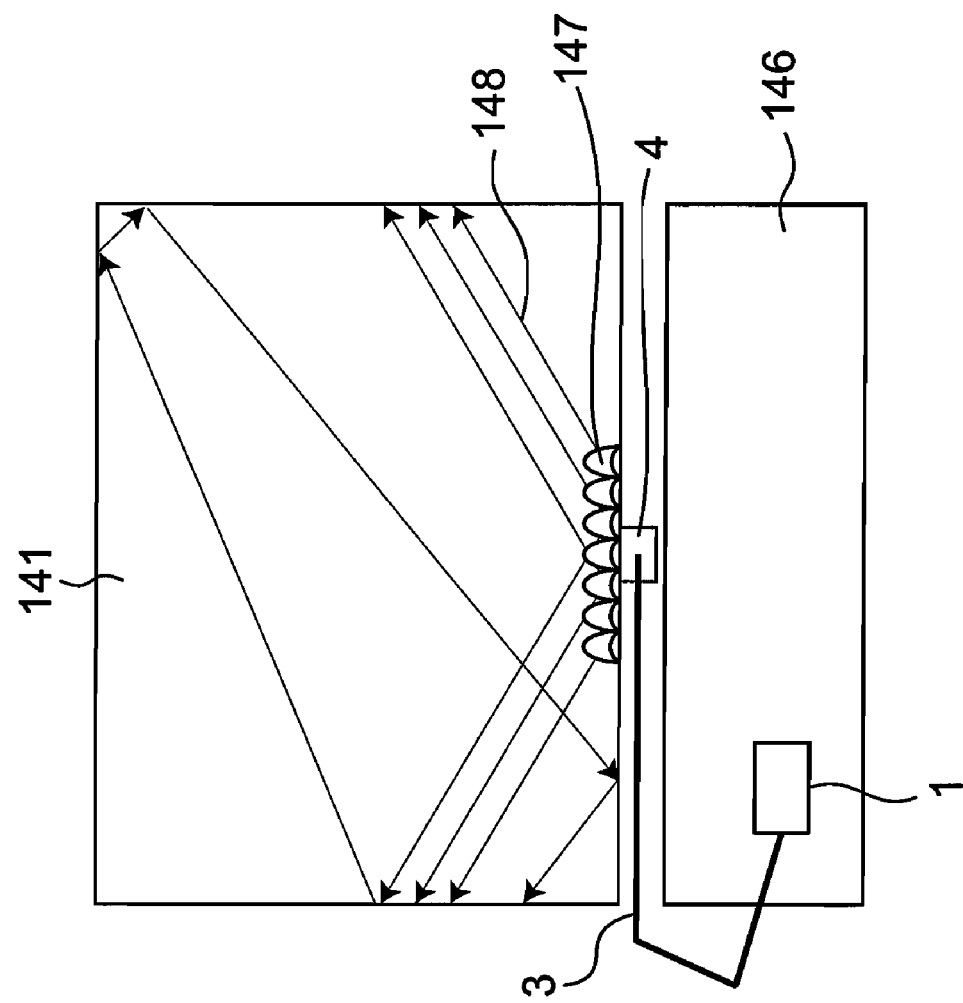
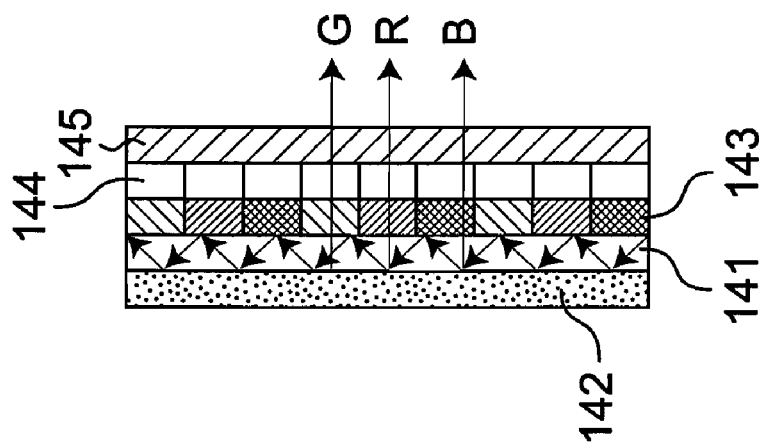

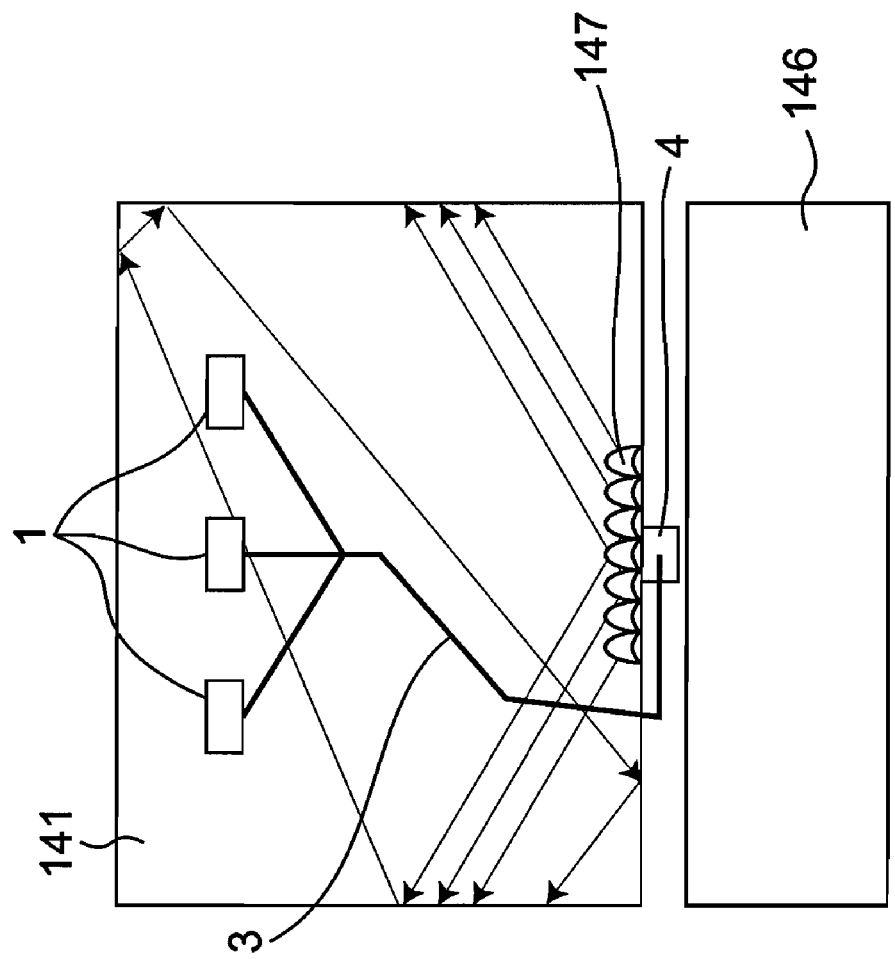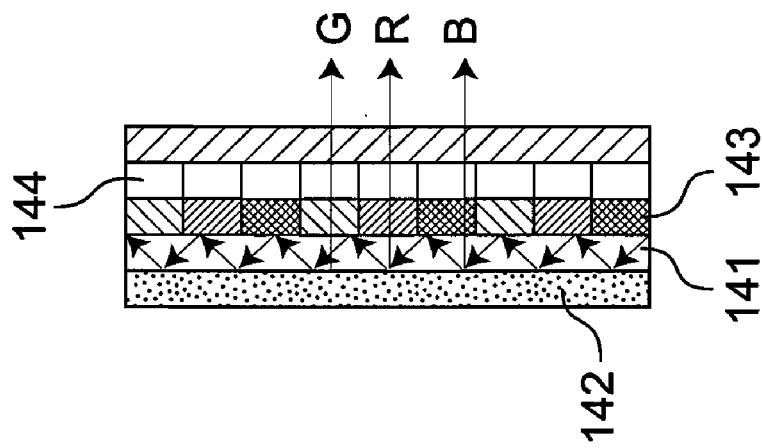

FIBER LASER AND OPTICAL DEVICE

BACKGROUND OF THE INVENTION

1. Technical Field

The invention relates to a fiber laser and an optical device using the fiber laser.

2. Description of Related Art

A conventional laser device includes a solid-state laser and a wavelength conversion element in a resonator, converts laser light of the solid-state laser device into a harmonic wave, and outputs a green visible light. The conventional laser device separates P-polarization and S-polarization on the basis of difference in reflectance of P-polarization and S-polarization, and emits a single polarized light. In this method, however, the solid-state laser light cannot be converted efficiently into a green laser light and outputted.

Recently, as a laser light source of high output, a fiber laser having a core of solid-state laser medium is developed. The fiber laser includes a solid-state laser fiber having a core doped with optically active rare earth ions such as Nd, Yb, or Er, and an optically reflective element arranged at a specified spacing along the solid-state laser fiber. When a pump light of specified wavelength is entered in the fiber, rare earth ions are excited, and the solid-state laser fiber becomes a gain medium, and a resonator is made by using the optically reflective element, and a laser is oscillated. The optically reflective element is demanded to have characteristics of transmitting the pump light and reflecting the excitation light excited by the gain medium, and are realized by, for example, a grating fiber capable of forming periodic refractive index changes in the fiber and reflecting a specific wavelength by Bragg reflection.

A method of using this fiber laser as a light source of single polarization is disclosed in JP A-11-501158. The polarization control fiber laser in JP A-11-501158 has the laser medium as polarization preserving fiber, and the laser medium is dependent on polarization. The polarization control fiber laser increases the loss on one polarized light, and propagates other polarized light of smaller loss, and thereby outputs a single polarized light. Further, the ray of fiber laser is coupled to an optical fiber amplifier, and a ray of high intensity is released from the optical fiber amplifier. Thus, the conventional fiber laser oscillates the laser in a mode of smaller loss in the resonator based on the polarization control of increasing the loss of one polarized light of two different polarized light components.

SUMMARY OF THE INVENTION

1. Problems to be Solved by the Invention

The polarization control fiber laser using the optical fiber amplifier in patent document 1 is capable of oscillating laser at high efficiency and high output, but is complicated in structure in order to emit a single polarized light by controlling polarization.

The invention is devised to solve the problems of the prior art, and it is hence an object thereof to present a fiber laser and an optical device using the fiber laser with a simple structure capable of emitting a single polarized light by controlling polarization.

2. Means for Solving the Problems

The fiber laser of the invention includes a solid-state laser fiber doped with a rare earth element, a pump light source that excites the solid-state laser fiber, a reflective element having wavelength dependency, and a wavelength conversion element arranged at the output side of the solid-state laser fiber away from the reflective element at a specified distance along the solid-state laser fiber, in which an end face of the wavelength conversion element is inclined to an optical axis.

Preferably, the reflective element is a grating fiber, and the wavelength conversion element may also include birefringence or reflective element. The solid-state laser fiber may be a polarization preserving fiber.

Further, a second solid-state laser fiber or grating fiber may be provided at the output side of the wavelength conversion element.

The end face of wavelength conversion element may satisfy the Brewster angle condition with respect to the light emitted from the solid-state laser fiber. The wavelength conversion element may have a periodic polarization inverting structure.

A prism or a second wavelength conversion element may be also provided at the output side of the wavelength conversion element.

The solid-state laser fiber may contain at least any one of Yb, Er, Nd, Pr, Cr, Ti, V, and Ho.

The wavelength conversion element may be any one of $LiNbO_3$ doped with Mg, $LiTaO_3$ doped with Mg, and $KTiOPO_4$ having periodic polarization inverting structure, $LiNbO_3$ doped with Mg and having stoichiometric composition, and $LiTaO_3$ doped with Mg and having stoichiometric composition.

The wavelength conversion element is an uniaxial nonlinear optical crystal, the end face of the wavelength conversion element is inclined to the incident light from the solid-state laser fiber, the propagation direction of incident light is nearly orthogonal to the C-axis of the nonlinear optical crystal, and the end face may be parallel to the C-axis of the nonlinear optical crystal.

In the nonlinear optical crystal, the electric field amplitude direction of P-polarization of the incident light may be nearly parallel to the C-axis of the nonlinear optical crystal.

The wavelength conversion element is an uniaxial nonlinear optical crystal, the end face of the wavelength conversion element is inclined to incident light from the solid-state laser fiber, the propagation direction of incident light is nearly orthogonal to the C-axis of the nonlinear optical crystal in the wavelength conversion element, and the end face may be inclined to the C-axis of the nonlinear optical crystal.

In the nonlinear optical crystal, the electric field amplitude direction of S-polarization of incident light may be nearly parallel to the C-axis of the nonlinear optical crystal. The angle of an end face of the wavelength conversion element and the incident light may be close to a Brewster angle. The wavelength conversion element may have the end face which is nearly vertical to the X-axis of the nonlinear optical crystal.

An optical device of the invention includes the fiber laser, and an image conversion optical system that converts the light from the fiber laser into a two-dimensional image.

The image conversion optical system may be a two-dimensional beam scanning optical system.

The image conversion optical system may be a two-dimensional switch.

The optical device may include a fiber laser that generates a green light, and a semiconductor laser light source that generates a red light and a blue light, and the image conversion optical system may convert light from the fiber laser and the semiconductor laser light source into a two-dimensional color image.

The image conversion optical system may further include a waveguide plate that causes light emitted from the fiber laser to propagate, and a liquid crystal display panel. The optical device may further include a control unit that controls the liquid crystal display panel, and the wavelength conversion element may be arranged at the lateral side of the waveguide plate, and the pump light source may be arranged in the control unit.

The pump light source may include a plurality of laser light sources, and the plurality of laser light sources may be arranged on the rear face of the liquid crystal display panel and spaced from each other at a specific distance.

3. Effects of the Invention

According to the invention, a fiber laser of simple structure and an optical device using this fiber laser are provided, and a single polarized light can be output by controlling polarization.

BRIEF DESCRIPTION OF THE DRAWINGS

FIG. 1 is a diagram showing a structure of a fiber laser in a first embodiment of the invention.

FIG. 2A is a magnified view around a wavelength conversion element, and FIG. 2B is a characteristic factorial diagram showing a reflectance to incident angle and a polarization angle difference.

FIG. 3A is a magnified view around a wavelength conversion element, and FIG. 3B is a characteristic factorial diagram showing a reflectance to incident angle and a polarization angle difference.

FIG. 6A is a diagram showing a structure of a fiber laser in a fourth embodiment of the invention, FIG. 6B is a partial magnified view around a wavelength conversion element, and FIG. 6C is a partial magnified view of other example around a wavelength conversion element.

FIGS. 14A and 14B are diagrams showing a structure of an optical device in an eleventh embodiment of the invention, FIG. 14A is a side view, and FIG. 15B is a top view.

FIGS. 15A and 15B are diagrams showing a structure of an optical device in a twelfth embodiment of the invention, FIG. 15A is a side view, and FIG. 15B is a top view.

REFERENCE NUMERALS

Figure 2A:
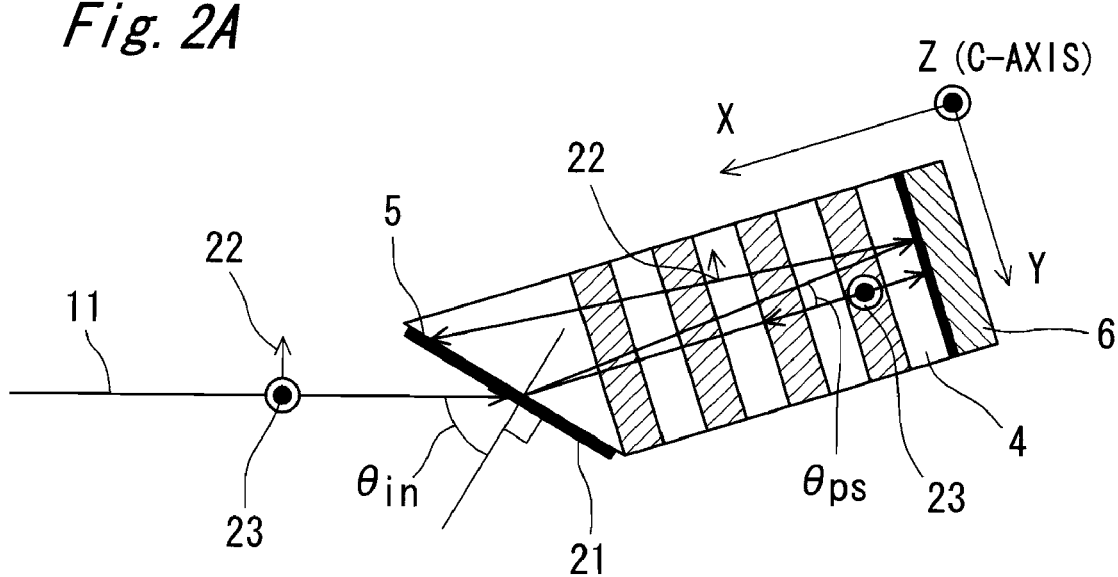
FIGS. 2A and 2B are diagrams of wavelength conversion of P-polarization.

1 Pump light source
2, 51 Grating fiber
3 Solid-state laser fiber
4, 44, 61, 111 Wavelength conversion element
5 Incident plane
6, 42, 65 Reflection film
7, 66, 77 Higher harmonics
8 Focusing optical system
9 Pe-polarization
10 Po-polarization
21 AR coat
22 P-polarization
23 S-polarization
41 Focusing optical system
43 Fiber
45 Exit plane
63, 64 End plane
62, 102 Prism
121 Coherent light source
122 Collimating optical system
123 Integrator optical system
124 Diffusion plate
125 Liquid crystal display panel
126 Projection lens
127 Screen
131 RGB laser light source
132, 133 Mirror
134 Screen
141 Waveguide plate
142 Diffusion plate
143 Filter
144 Liquid crystal display panel
145 Polarizer
146 Control unit
147 Diffusion element

DETAILED DESCRIPTION OF THE INVENTION

Embodiment 1

FIG. 1 shows structure of a fiber laser in embodiment 1 of the invention.

[Overall Configuration of Fiber Laser]

The fiber laser of the embodiment includes a pump light source 1, a grating fiber 2 which transmits light of wavelength $\lambda p$ outputted from the pump light source 1 and reflects light of specific wavelength, a solid-state laser fiber 3 doped with a rare earth element, a focusing optical system 8 for focusing the light emitted from the solid-state laser fiber 3, a wavelength conversion element 4 arranged along the solid-state laser fiber 3 and spaced from the solid-state laser fiber 3 at a predetermined distance, and a reflection film 6 which is disposed at the exit end of the wavelength conversion element 4, reflects a fundamental harmonic and transmits a higher harmonic 7.

The light of wavelength $\lambda p$ outputted from the pump light source 1 passes through the grating fiber 2 having wavelength dependence, and enters the solid-state laser fiber 3. The solid-state laser fiber 3 is activated by the light of wavelength $\lambda p$ and oscillates laser at wavelength $\lambda 1$. The grating fiber 2 forms periodic refractive index changes, and reflects specific wavelength by Bragg reflection. The wavelength $\lambda 1$ is fixed by the gain wavelength of the solid-state laser fiber 3 and Bragg reflection wavelength of the grating fiber 2. In this embodiment, a resonator of solid-state laser fiber 3 is formed by the grating fiber 2 and the reflection film 6 arranged at the exit end of the wavelength conversion element 4.

In the embodiment, the wavelength conversion element 4 reduces the wavelength to half, and converts the light outputted from the pump light source 1 into a green color. To convert wavelength at high efficiency in the wavelength conversion element 4, high power density of light, high beam quality, and single polarization characteristic are demanded. Usually, a single polarized light source is converted by the wavelength conversion element, but in the invention, by contrast, the fiber laser light is converted into a single polarized light by optical feedback making use of birefringence index of the wavelength conversion element 4.

The wavelength conversion element 4 is a uniaxial nonlinear optical crystal, and it is an optical crystal having birefringence index in this embodiment. The incident plane 5 of wavelength conversion element 4 is formed obliquely, and the wavelength conversion element 4 is inclined to the solid-state laser fiber 3. The light emitted from the solid-state laser fiber 3 is fed into the incident plane 5 in a state inclined to the optical axis, and the incident light 11 is refracted at different angle by polarization depending on the birefringence index of the wavelength conversion element 4.

The incident light 11 entering the incident plane 5 at different refractive angle is polarized and separated in the wavelength conversion element 4. In FIG. 1, the light is separated into Pe-polarization 9 and Po-polarization 10. The Pe-polarization 9 is a polarized light in the C-axis direction of crystal of the wavelength conversion element 4, and the Po-polarization 10 is a polarized light in the X, Y-axis direction. In FIG. 1, the Pe-polarization 9 becomes the optical axis converted in wavelength highly effectively in the wavelength conversion element 4. A reflection film 6 is deposited on a plane nearly vertical to the Pe-polarization 9, and a resonator structure is formed between the reflection film 6 and the grating fiber 2, and the light of Pe-polarization as single polarized light of wavelength λ1 satisfies the condition of resonator, and laser is oscillated. The light of Po-polarization 10 has an angle different from right angle to reflection film 6, and is not fed back to the solid-state laser fiber 3, and laser oscillation does not occur.

[Specific Example of Polarization and Separation]

A specific example is described in which the incident light 11 containing P-polarization having polarized light in a direction parallel to the incident plane 5 (electric field amplitude direction of light), and S-polarization as polarized component orthogonal thereto, is separated into the P-polarization and the S-polarization.

Figure 3A:
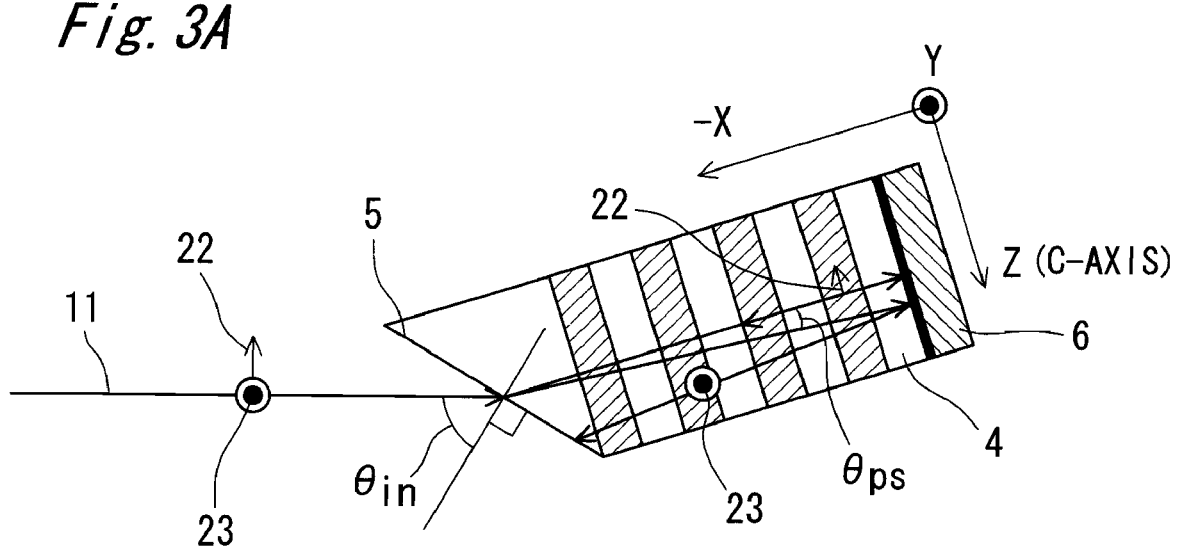
FIGS. 3A and 3B are diagrams of wavelength conversion of S-polarization.

FIG. 2A and FIG. 3A are partially magnified views around the wavelength conversion element 4 in FIG. 1. When separating the polarized light by making use of birefringence index of the wavelength conversion element 4, the configuration of wavelength conversion element 4 differs significantly depending on the direction of polarization. In this embodiment, the wavelength conversion element 4 is a PPMgLN (LiNbO$_3$ doped with Mg and having a periodic polarization inversion structure).

[Wavelength Conversion of Light of P-Polarization]

FIG. 2A shows a structure of wavelength conversion of light of P-polarization as incident light. The incident light 11 outputted from the solid-state laser fiber 3 enters the incident plane 5 at an angle of incident angle θin. The incident light 11 is angularly separated into P-polarization 23 and S-polarization 22 within crystal depending on birefringence of the wavelength conversion element 4. At this time, the angle formed by propagation directions of P-polarization 23 and S-polarization 22 is indicated as polarization angle difference θps. The polarized light can be separated by the polarization angle difference θps.

In the structure shown in FIG. 2A, since the P-polarization 23 is converted in wavelength, the electric field amplitude direction of the P-polarization 23 and the C-axis direction of crystal of the wavelength conversion element 4 are matched. In the case of PPMgLN, the nonlinearity constant is maximum in the C-axis direction of crystal. The reason is that highest conversion efficiency can be obtained when the C-axis and the electric field amplitude direction of light are matched.

The P-polarization 23 entering the crystal of the wavelength conversion element 4 propagates in X-direction, and is reflected by the reflection film 6 arranged on the ZY plane, and runs reversely in the same route as the original incident light 11, and returns to the solid-state laser fiber 3. On the other hand, the S-polarization 22 is different from the P-polarization 23 in the refractive angle, and is reflected at a certain angle by the reflection film 6, and is separated from P-polarization 23. The relation of the incident angle θin and the reflectance of P-polarization 23 on the incident plane 5, and the relation of the incident angle θin and the polarization angle difference θps of P- and S-polarization in crystal at this time were calculated in PPMgLN, and results are shown in FIG. 2B.

Figure 2B:
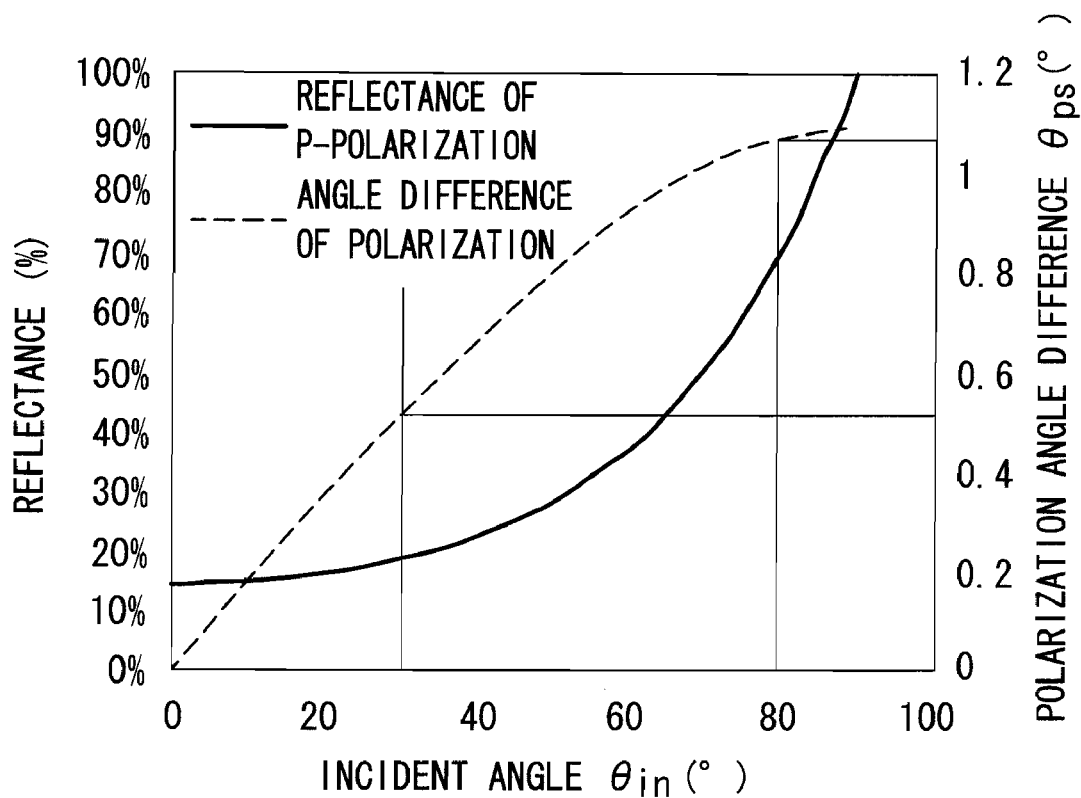

As shown in FIG. 2B, the reflectance and polarization angle difference θps are increased along with the incident angle θin.

When the polarization angle difference θps is small, two polarized lights cannot be separated sufficiently, and a polarization angle difference θps of 0.5 degree or more is provided. Preferably, the incident angle θin is 30 degrees or more, more preferably the incident angle θin is 60 degrees or more. When the incident angle θin is 60 degrees or more, the polarization difference angle θps is 0.8 degree or more, and the polarized light can be separated sufficiently. At 80 degrees or more, the polarization difference angle θps is saturated.

When the value of incident angle θin is large, the reflectance of the P-polarization 23 at the incident plane 5 is large, and the loss is increased. Accordingly, the incident plane 5 is provided with an AR coat 21, and reflection of P-polarization 23 is prevented. The propagating direction of P-polarization 23 in the crystal is preferred to coincide with the X-axis of the crystal. The X-axis is a direction projected in a plane vertical to the a-axis and C-axis of the crystal. In the case of PPMgLN, by forming the polarization inverting structure along the Y-axis of the crystal, it is easy to invert the polarization uniformly, and the propagating direction is preferred to be the X-axis direction. In this case, the angle formed by the incident plane 5 and X-axis is determined by the refractive index of substrate of the wavelength conversion element 4.

[Wavelength Conversion of Light of S-Polarization]

FIG. 3A shows a structure of wavelength conversion of light of S-polarization. FIG. 3A is similar to FIG. 2A, except that the C-axis direction of crystal is parallel to the sheet of paper, and the incident plane 5 is inclined to the C-axis of crystal. In FIG. 3A, same as in FIG. 2A, the incident light 11 enters the incident plane 5 at an angle of incident angle θin, and is polarized and separated. In FIG. 3A, the S-polarization 22 enters to be vertical to the reflection film 6. The S-polarization 22 is reflected by the reflection film 6, passes through the route of incident light 11, and returns to the solid-state laser fiber 3. On the other hand, the P-polarization 22 is separated angularly, and released outside. To maximize the conversion efficiency of S-polarization 22, the C-axis of crystal of the wavelength conversion element 4 and the electric field amplitude direction of S-polarization 22 are designed to coincide with each other.

Figure 3B:
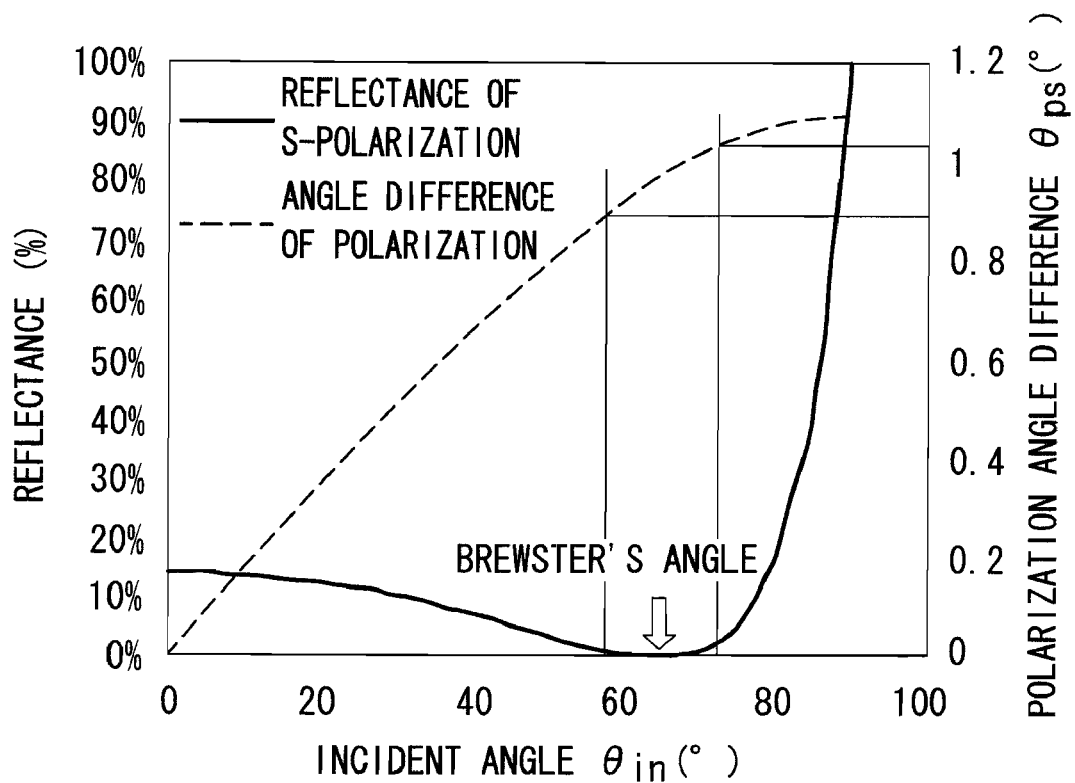

The relation of the incident angle θin and the reflectance of S-polarization 22 on incident plane 5, and the relation of the incident angle θin and the polarization angle difference θps of P- and S-polarization in crystal were calculated in PPMgLN, and results are shown in FIG. 3B. As shown in FIG. 3B, the reflectance on the incident plane 5 is almost 0%, near the Brewster's angle. Near the Brewster's angle, the polarization angle difference θps is 0.8 degrees or more, and P- and S-polarization can be separated without crosstalk. The value of incident angle θin is preferably designed to be "Brewster's angle+/−10 degrees" or more preferably "Brewster's angle+/−5 degrees or less." Thus, when converting the wavelength of S-polarization, the structure of Brewster's angle can be utilized. Near the Brewster's angle, since there is no reflection on the incident plane 5, antireflection film is not needed, and the structure is simplified. In the case of PPMgLN, the incident angle for satisfying the Brewster condition and matching the C-axis of crystal and the electric field amplitude direction of S-polarization in crystal is about 65 degrees.

Thus, by using the wavelength conversion element 4 for converting the wavelength of single polarized light at high efficiency, the fiber laser light is converted into a single polarized light, and higher harmonics 7 of high efficiency and high output can be produced in a simple structure.

In the configuration of the invention, moreover, since the wavelength conversion element 4 is inserted in the resonator composed of the grating fiber 2 and the reflection film 6, a higher power density of fundamental wave can be utilized as compared with wavelength conversion outside of a resonator, and wavelength conversion of higher efficiency is realized.

In addition to the difference in reflectance between the P-polarization 23 and the S-polarization 22, by making use of birefringence of the wavelength conversion element 4 differing in refractive index depending on polarization, the P-polarization and S-polarization are separated by the polarization angle difference θps, and as compared with the prior art, the P-polarization and S-polarization can be separated more securely. In the conventional solid-state laser device having a solid-state laser and a wavelength conversion element in a resonator, if the polarization angle difference is provided by the wavelength conversion element, both P-polarization and S-polarization return to the solid-state laser, and the polarization could not be separated by the polarization angle difference. In the embodiment, on the other hand, since the solid-state laser fiber 3 is thin and the core is small, and if the polarization angle difference θps is small, either one of P-polarization and S-polarization may be prevented from returning to the solid-state laser fiber 3, so that the P-polarization and S-polarization can be separated securely.

By using the fiber laser of the embodiment, by making use of the laser light outputted from the pump light source 1, blue and green lights can be emitted at the same time, or red, blue and green lights can be emitted at the same time. Or these outputs can be changed over. By using the fiber laser of the embodiment, RGB light of high luminance can be obtained by a single light source.

In the embodiment, the oblique end face of the wavelength conversion element 4 is provided on the incident plane 5, but as mentioned below, alternatively, the oblique end face may be provided on the exit plane of the wavelength conversion element 4 or inside of the wavelength conversion element 4, and the polarization can be similarly separated by adjusting its angle. The focus of the focusing optical system 8 for focusing the light emitted from the solid-state laser fiber 3 is preferably formed on the reflection film 6. The reflection film 6 and the exit end face of solid-state laser fiber 3 form a confocal optical system, and there is no loss of light from the reflection film 6, and the light stably returns to the solid-state laser fiber 3.

The solid-state laser fiber 3 is preferably a double clad fiber doped with a rare earth element in the core. Excitation of high output is realized, and laser oscillation of high output is possible. As the rare earth element, Yb-doped fiber is preferred because light at wavelength of about 1030 to 1100 nm can be generated at high efficiency, and when combined with the wavelength conversion element 4, green light and blue light of high efficiency and high output can be generated.

The solid-state laser fiber 3 may also contain other elements such as Er, Nd, Pr, Cr, Ti, V, or Ho ion. By using Nd-doped fiber, light emission near 1060 nm is easy. By using other ions, light sources of different wavelengths can be realized.

The solid-state laser fiber 3 may be also realized by a polarization preserving fiber having birefringence index. By using the birefringent polarization preserving fiber, polarization is maintained in the fiber, and the output is stabilized. If polarization preserving fiber is not used, the polarization in the fiber is changed by disturbance. By this change, the output of laser light fluctuates. To prevent this and stabilize the output, it is preferred to use the polarization preserving fiber as the solid-state laser fiber. When the solid-state laser fiber is the polarization preserving fiber, its polarization axes are matched with the directions of P-polarization and S-polarization of the wavelength conversion element 4, respectively.

Preferably, the exit end plane of the solid-state laser fiber 3 should be polished obliquely. By suppressing laser oscillation by return light from the exit end plane of the solid-state laser fiber 3, a single polarized light is realized efficiently.

The wavelength conversion element 4 is preferably a wavelength conversion element composed of a nonlinear optical crystal having periodic polarization inverting structure, as SHG (Second Harmonic Generation) or SFG (Sum Frequency Generation) wavelength conversion element. The wavelength conversion element having polarization inverting structure includes $KTiOPO_4$, $LiNbO_3$, $LiTaO_3$, $LiNbO_3$ doped with Mg, $LiTaO_3$ doped with Mg, stoichio $LiNbO_3$, and stoichio $LiTaO_3$. These crystals have a high nonlinear constant, and wavelength conversion at high efficiency is possible. By changing the periodic structure, the phase matching wavelength can be designed freely. By using the single optical crystal making use of these features, green light and blue light can be generated.

Besides, since the angle difference by polarization is not so large, in order to separate the polarization, the length of the wavelength conversion element 4 is preferred to be 10 mm or more, or more preferably 20 mm or more.

As the reflection film 6, a dielectric multilayer film may be used. The dielectric multilayer film is preferred to reflect fundamental harmonics and pass higher harmonics 7. This is because the higher harmonics 7 can be efficiently taken outside. Besides, a structure not using the reflection film 6 may be also possible. Since there is a reflection of about 10% by Fresnel reflection by difference in refractive index between a nonlinear optical crystal and air, oscillation of solid-state laser fiber 3 is possible, and the structure is further simplified. In this case, however, reflection loss of higher harmonics 7 occurs.

As the reflection film 6, a dielectric multilayer film having wavelength dependent property may be used. By using a dielectric multilayer film having narrow band reflection characteristic, by matching the reflection bands of the grating fiber 2 and the reflection film 6, the spectrum of oscillating laser can be further narrowed in band. When the spectrum is narrower in band, the conversion efficiency of the wavelength conversion element 4 is enhanced.

In the embodiment, the reflection film 6 is provided on the exit end face of the wavelength conversion element 4, but it may be also provided inside of the wavelength conversion element 4, or a reflection portion may be formed outside of the wavelength conversion element 4. After separating the polarization by making use of birefringence of wavelength conversion element 4, either one polarized light is selectively fed back to the solid-state laser fiber 3 by the reflection film 6, so that the light emitted from the solid-state laser fiber 3 can be formed as a single polarized light.

The fiber laser of the embodiment can generate green light or blue light by making use of wavelength conversion. When the laser light source uses a fiber amplifier for making high output easily, green light or blue light of high output can be generated. Further, by converting the wavelength of single polarized light at high efficiency by using the wavelength conversion element 4, a visible light can be generated.

Embodiment 2

Figure 4:
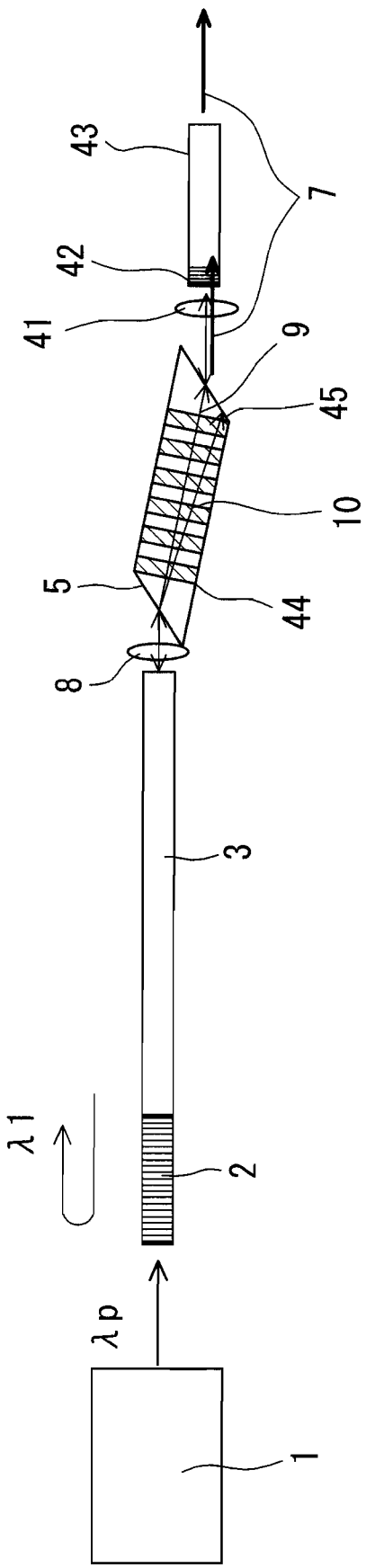
FIG. 4 is a diagram showing a structure of a fiber laser in a second embodiment of the invention.

FIG. 4 shows structure of a fiber laser in embodiment 2 of the invention. The fiber laser of the embodiment is designed to reflect the light polarized and separated by a wavelength conversion element 44 at the outside of the wavelength conversion element 44, and feedback the light to the solid-stage laser fiber 3. The fiber laser of the embodiment further includes a focusing optical system 41 and a fiber 43 provided at the exit face side of the wavelength conversion element 44, in addition to the structure of embodiment 1. The fiber 43 is a solid-state laser fiber. In embodiment 1, the reflection film 6 is provided at the exit face of wavelength conversion element 4, but a reflection film 42 in this embodiment is provided at the incident face of the fiber 43. The exit face 45 of the wavelength conversion element 44 is formed obliquely same as the incident plane 5.

In FIG. 4, the light emitted from the solid-state laser fiber 3 is separated into Pe-polarization 9 and Po-polarization 10 in the crystal by making use of birefringence index of the wavelength conversion element 44, and the Pe-polarization 9 out of two polarized lights is designed to be focused on the reflection film 42 provided at the end face of the fiber 43. The Pe-polarization 9 is reflected by the end face of the fiber 43, and is fed back to the solid-state laser fiber 3 to fix the polarization of oscillation of the solid-state laser fiber 3 on Pe-polarization. The reflection film 42 is a dielectric multilayer film, which reflects the fundamental harmonics and transmits higher harmonics 7.

According to this embodiment, since the higher harmonics 7 can be obtained as fiber light, it is easy to handle light as a light source, in addition to the effects of embodiment 1.

Embodiment 3

Figure 5:
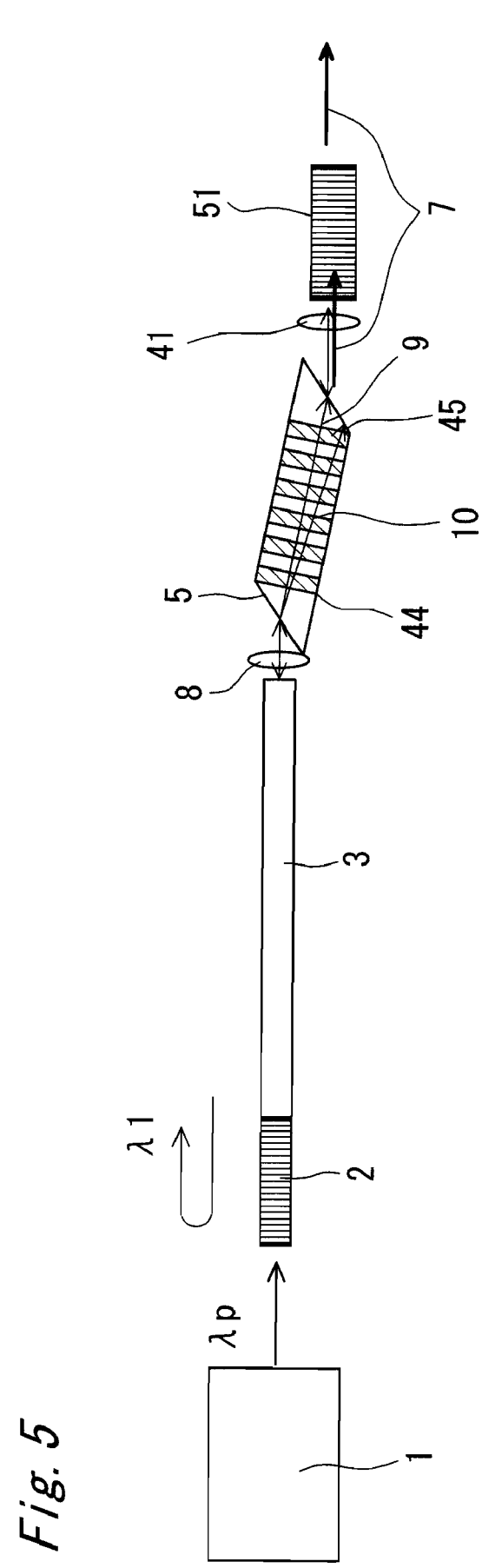
FIG. 5 is a diagram showing a structure of a fiber laser in a third embodiment of the invention.

FIG. 5 shows structure of a fiber laser in embodiment 3 of the invention. The fiber laser of this embodiment has other structure designed to reflect the light polarized and separated by the wavelength conversion element 44 at the outside of the wavelength conversion element 44, and feed back the light to the solid-stage laser fiber 3. The fiber laser of this embodiment includes a grating fiber 51, instead of the fiber 43 of embodiment 2.

By Bragg reflection of the grating fiber 51, higher harmonics 7 and fundamental harmonics are separated. The Pe-polarization 9 separated by the wavelength conversion element 44 is reflected by Bragg reflection of the grating fiber 51.

In the embodiment, the grating fiber 51 has narrow band characteristic, and by selecting the wavelength by both grating fibers 2 and 51, the oscillation spectrum of the solid-state laser fiber 3 can be narrowed in band. Hence, the conversion efficiency in the wavelength conversion element 44 can be enhanced.

Embodiment 4

FIG. 6A shows structure of a fiber laser in embodiment 4 of the invention. The fiber laser of this embodiment has a structure designed to polarize and separate light by a wavelength conversion element 61 by making use of difference in reflectance between P-polarization and S-polarization near Brewster's angle. The fiber laser of this embodiment has the wavelength conversion element 61, and a prism 62 of same material as the wavelength conversion element 61, and a reflection film 6 is provided at the exit end side of the prism 62. An oblique end face 63 is provided at the exit end side of the wavelength conversion element 61, and the end face 64 of the prism 62 is formed obliquely along the end face 63. In the embodiment, the pump light source 1, the grating fiber 2, the solid-state laser fiber 3, and the focusing optical system 8 are same as those of in embodiment 1.

Figure 7:
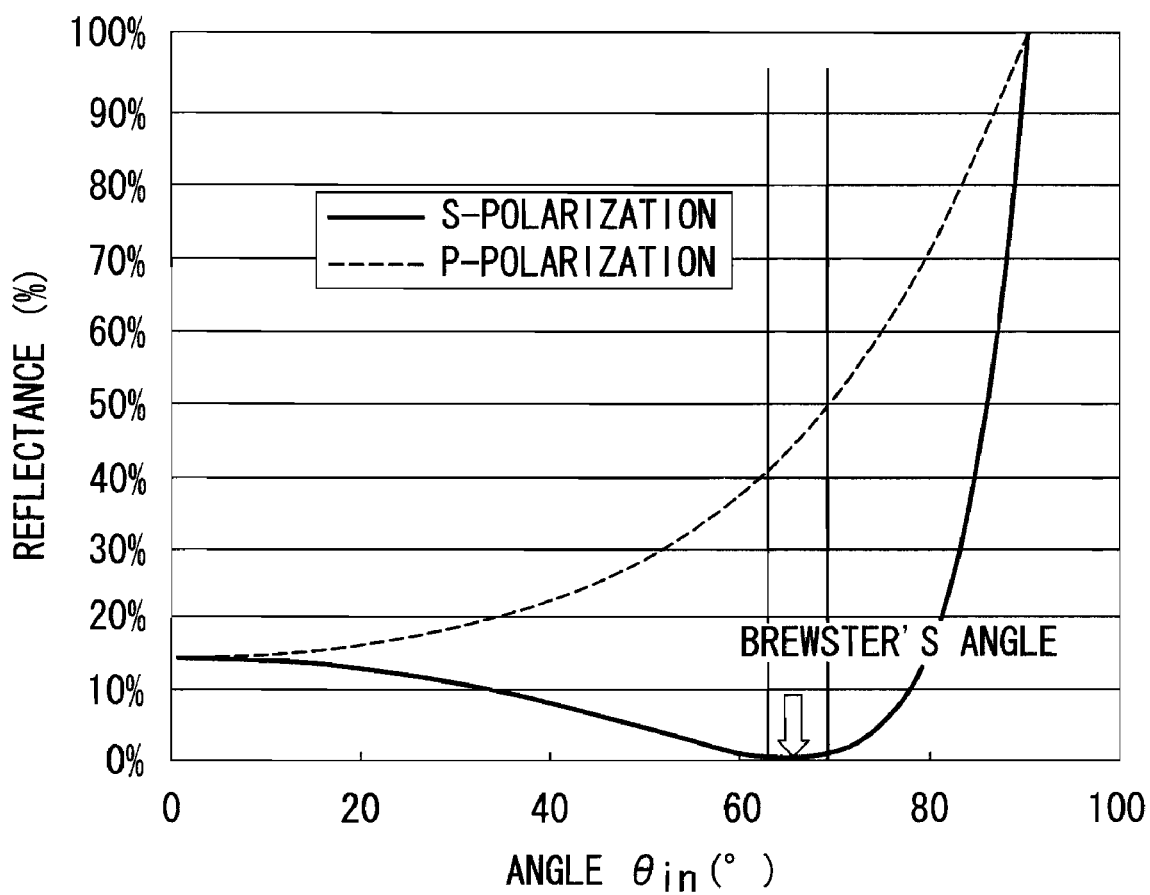
FIG. 7 is a characteristic factorial diagram showing a reflectance to incident angle in embodiment 4.

FIG. 6B is a partially magnified view around the wavelength conversion element 61, and FIG. 6C is a partially magnified view showing other example around the wavelength conversion element 61. FIG. 6C is described later. As shown in FIG. 6B, the end face 63 of the wavelength conversion element 61 and the end face 64 of the prism 62 are formed at an angle θin to the optical axis. The reflectance of P-polarization and S-polarization at end faces 63, 64 was calculated, and results are shown in FIG. 7. As shown in FIG. 7, the reflectance is different significantly between P-polarization and S-polarization. By forming end faces 63 and 64 having Brewster's angle θin in the wavelength conversion element 61 and prism 62, respectively, the 100% of S-polarization is transmitted, and the about 60% of P-polarization is transmitted. In the configuration of the embodiment, since the laser light is reflected by the reflection film 6 provided at the exit face side of prism 62, the laser light passes the oblique end face two times in going stroke and two times in returning stroke. As a result, the feedback rate of P-polarization returning to the solid-state laser fiber 3 is about 13%. On the other hand, the S-polarization is not reflected by the end faces 63 and 64, and is fed back by nearly 100%. By making use of this difference in transitivity of polarization, the polarization can be separated, and the solid-state laser fiber 3 can be fixed in one polarization.

According to the embodiment, the separation ratio of P-polarization and S-polarization is increased, and more reliable separation is guaranteed. In addition, since the optical path is straightened by the prism 62, it is easy to design the optical path.

As shown in FIG. 6C, a reflection film 65 may be further provided at the incident side (the solid-state laser fiber 3 side) of the wavelength conversion element 61. The reflection film 65 passes fundamental harmonics and reflects higher harmonics. When fundamental harmonics reflected by the reflection film 6 pass through the wavelength conversion element 61 and are fed back to the solid-state laser fiber 3, the higher harmonics 66 converted by the wavelength conversion element 61 are emitted forward from the reflection film 65. As a result, the higher harmonics can be taken out efficiently. By combining higher harmonics 7 and higher harmonics 66, the conversion efficiency is enhanced significantly.

Embodiment 5

Figure 8:
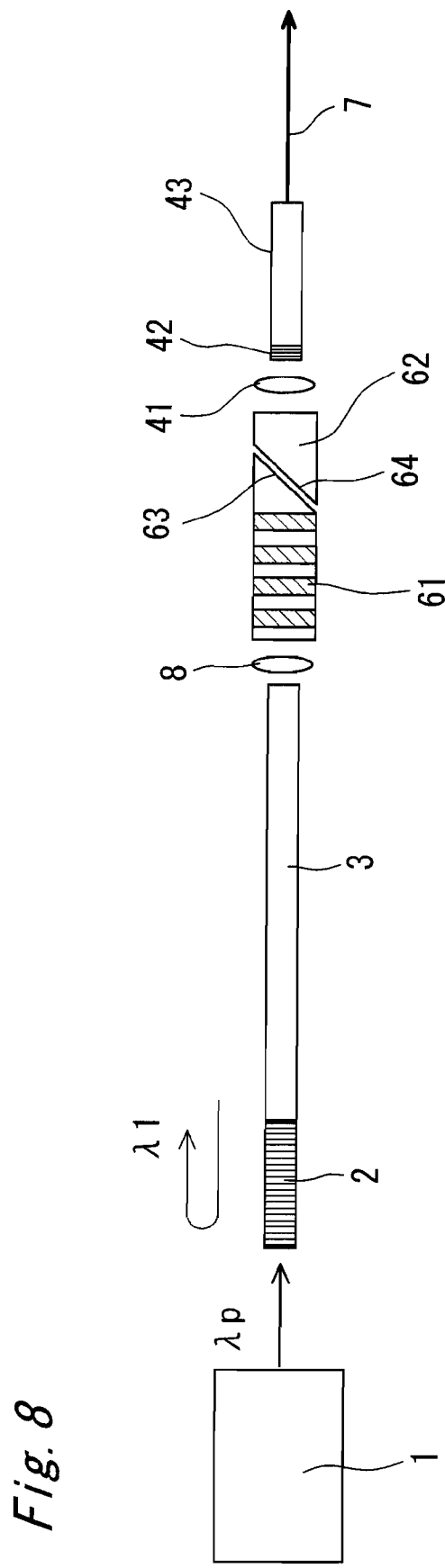
FIG. 8 is a diagram showing a structure of a fiber laser in a fifth embodiment of the invention.

FIG. 8 shows structure of a fiber laser in embodiment 5 of the invention. The fiber laser of this embodiment includes a focusing optical system 41 and a fiber 43 as a solid-state laser fiber at the output side of the prism 62, and a reflection film 42 is formed at an end face of incident side of the fiber 43. This embodiment has the same effects as embodiment 2. Same as in embodiment 4, the oblique end faces 63 and 64 are formed in the wavelength conversion element 61 and the prism 62, respectively. In the embodiment, same as in embodiment 4, the laser light passes the oblique end face two times in going stroke and two times in returning stroke. When the angle of end faces 63 and 64 is formed at Brewster's angle, the separation ratio of P-polarization and S-polarization is increased, and more reliable separation is guaranteed.

Embodiment 6

Figure 9:
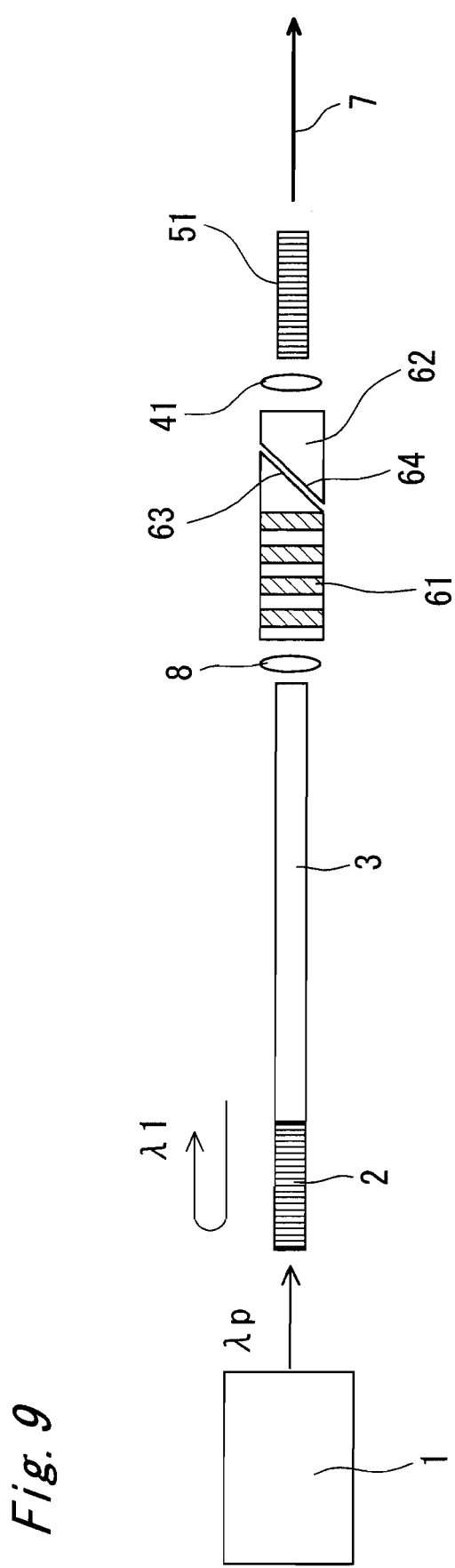
FIG. 9 is a diagram showing a structure of a fiber laser in a sixth embodiment of the invention.

FIG. 9 shows structure of a fiber laser in embodiment 6 of the invention. The fiber laser of this embodiment includes a focusing optical system 41 and a grating fiber 51 at the output side of the prism 62. The grating fiber 51 is preferably a polarization preserving fiber. By the polarization preserving fiber, polarization is stabilized, and the output is stabilized. When the polarization stabilization fiber is used, the direction of polarization of the grating fiber 51 preferably coincides with P- and S-polarization of the wavelength conversion element 61. If polarization is not matched, the single polarized light separated by the wavelength conversion element 61 is separated into plural polarized lights in the grating fiber 51, and the effect of single polarization is lowered. As in this embodiment, in the structure using the grating fiber 51, single polarization is realized, and same effects as in embodiment 3 can be obtained. Further, by defining the angle of end faces 63 and 64 in Brewster's angle, the separation ratio of P-polarization and S-polarization is increased, and more reliable separation is guaranteed.

Embodiment 7

Figure 10:
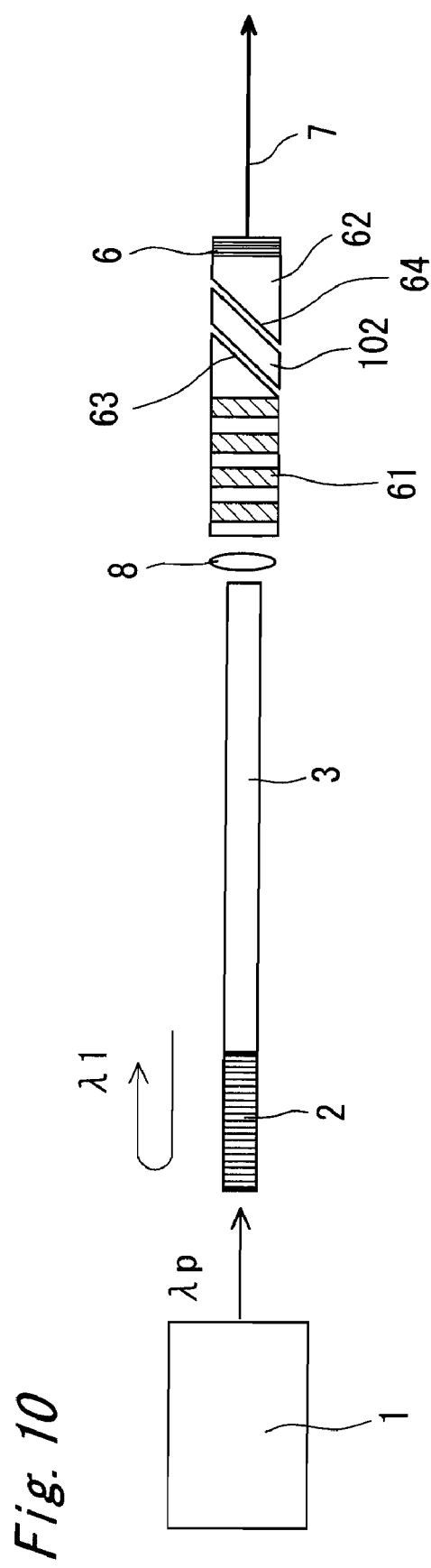
FIG. 10 is a diagram showing a structure of a fiber laser in a seventh embodiment of the invention.

FIG. 10 shows structure of a fiber laser in embodiment 7 of the invention. The fiber laser of this embodiment further includes a prism 102 which is made of same material as the wavelength conversion element 61 and is arranged between the wavelength conversion element 61 and the prism 62. Other configuration of this embodiment is same as in embodiment 4. Both end faces of the prism 102 are formed along the end face 63 of the wavelength conversion element 61 and the end face 64 of the prism 62 which form the Brewster's angle.

By having the prism 102, a plurality of oblique end faces having the Brewster's angle are formed, and the separation ratio of P-polarization and S-polarization is increased. For example, by forming two oblique end faces, the suppression ratio of P-polarization to S-polarization is increased by 2 times from 9 dB to 18 dB. By suppressing P-polarization, single polarization is improved, and the conversion efficiency is increased.

Embodiment 8

Figure 11:
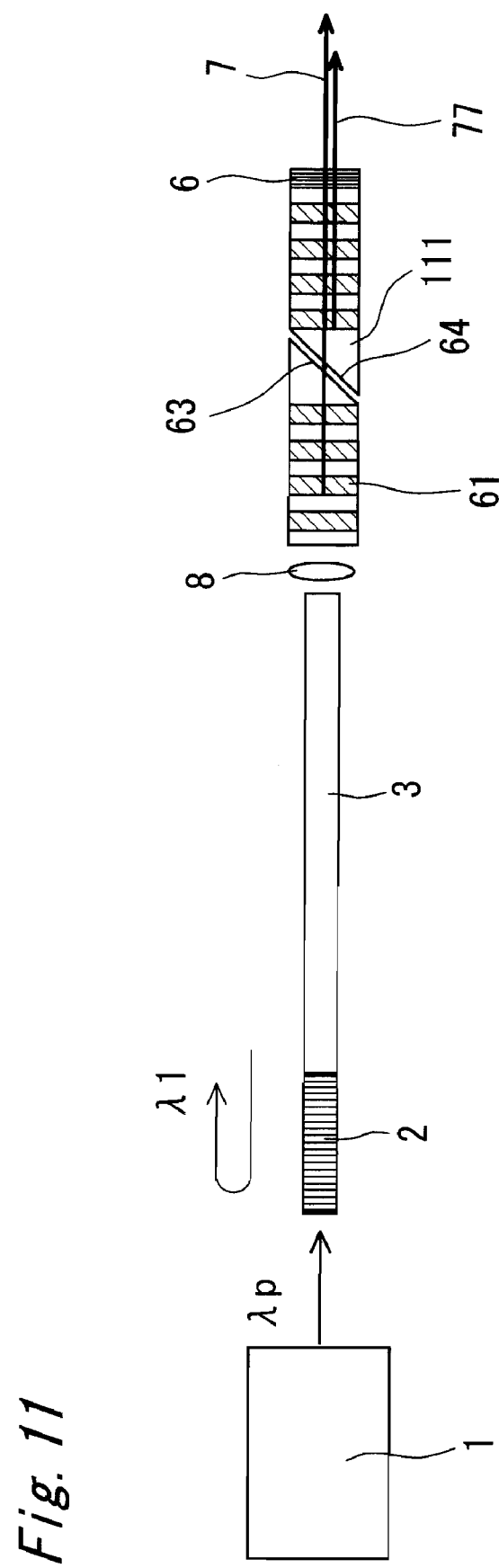
FIG. 11 is a diagram showing a structure of a fiber laser in an eighth embodiment of the invention.

FIG. 11 shows structure of a fiber laser in embodiment 8 of the invention. The fiber laser of the embodiment further includes a wavelength conversion element 111 at the output side of the wavelength conversion element 61, and a reflection film 6 is formed at the exit face end of the wavelength conversion element 111. A Brewster's angle is formed individually at end faces 63 and 64 of the wavelength conversion element 61 and the wavelength conversion element 111.

When forming the Brewster's angle at the wavelength conversion element 61 and the wavelength conversion element 111, the crystal may be adhered by way of a film differing in refractive index from the crystal. Or the crystal may be adhered by shutting in air space.

This embodiment brings about the effect of issuing higher harmonics 7 and 77 from the wavelength conversion element 61 and the wavelength conversion element 111, respectively, in addition to the effects of embodiment 4.

In embodiment 4 through embodiment 8, the incident end of the wavelength conversion element 61 is vertical to the incident light. However, if the reflection at the incident end of wavelength conversion element 61 is fed back to the solid-state laser fiber 3, undesired polarization mode occurs, and single mode polarization deteriorates. Accordingly, reflection at the incident end of the wavelength conversion element 61 is preferred to be decreased to 20 dB or less, more preferably 30 dB or less. Hence, it is preferred to prevent reflection by coating the incident end of wavelength conversion element 61 with no-reflection coat. Or by polishing the incident end of wavelength conversion element 61 obliquely, a specific angle is given to the incident light, and return light can be prevented. Further, by setting the angle of incident end of the wavelength conversion element 61 to satisfy the condition of Brewster's angle to incident light, the incident loss is decreased, and a more preferred effect is obtained.

Embodiment 9

Figure 12:
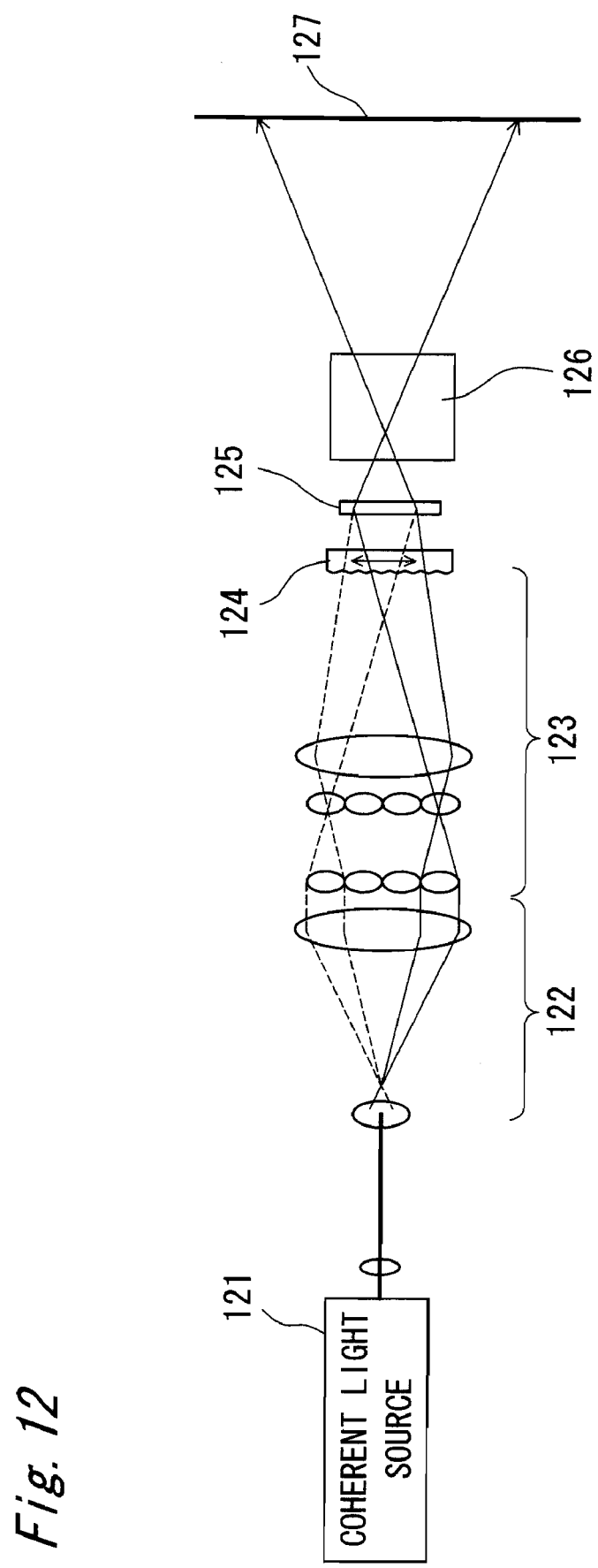
FIG. 12 is a diagram showing a structure of an optical device in a ninth embodiment of the invention.

FIG. 12 shows structure of an optical device using a coherent light source 121 having the fiber laser in any one of embodiments 1 to 8. The optical device of this embodiment is a laser display for converting the laser light emitted from the coherent light source 121 using the fiber laser of the above-mentioned embodiment into a two-dimensional image by a liquid crystal display panel 125 being a two-dimensional switch, and projecting the image on a screen 127. The light emitted from the coherent light source 121 passes through a collimating optical system 122, an integrating optical system 123, and a diffusion plate 124. Then, the light is converted into an image by the liquid crystal display panel 125, and is projected on the screen 127 by a projection lens 126. The position of the diffusion plate 124 is varied at moving speed of 5 mm/s by an oscillating mechanism. As a result, speckle noise generated on the screen 127 can be decreased.

The coherent light source 121 having the fiber laser in any one of embodiments 1 to 8 is capable of obtaining a stable output regardless of changes in ambient temperature, and the optical device of the invention having the coherent light source 121 produces a stable image at high output. Since the coherent light source 121 has high beam quality, the optical system can be designed easily, and is reduced in size and simplified in structure.

As the coherent light source 121, when a RGB laser light source producing red, green and blue laser lights is used, a laser display of high color reproducibility can be realized. In the RGB laser light source, a semiconductor laser of high output capable of emitting red laser light is developed and known, but high output is not realized in blue light, and it is hard to make a semiconductor laser of green light. Accordingly, as the output of green and blue laser lights, the fiber laser of the embodiment making use of wavelength conversion can be used. As a result, a high output is realized easily. The RGB laser light source may include the fiber laser for emitting green laser light and the semiconductor laser light sources for emitting red and blue lights, respectively. When using the fiber laser of the embodiment in the coherence light source 121 to generate green and blue light, or green, blue and red light simultaneously, the RGB laser light source of high output and small size can be realized. By having the coherent light source 121, it is applicable not only to a laser display, but also to an optical disk device and various optical devices. By using the fiber laser of the embodiment as the coherent light source 121, a laser display of large screen can be realized.

As the two-dimensional switch, aside from the liquid crystal display panel 125, a reflection type liquid crystal switch, DMD (Digital Mirror Device), and others may be used.

Embodiment 10

Figure 13:
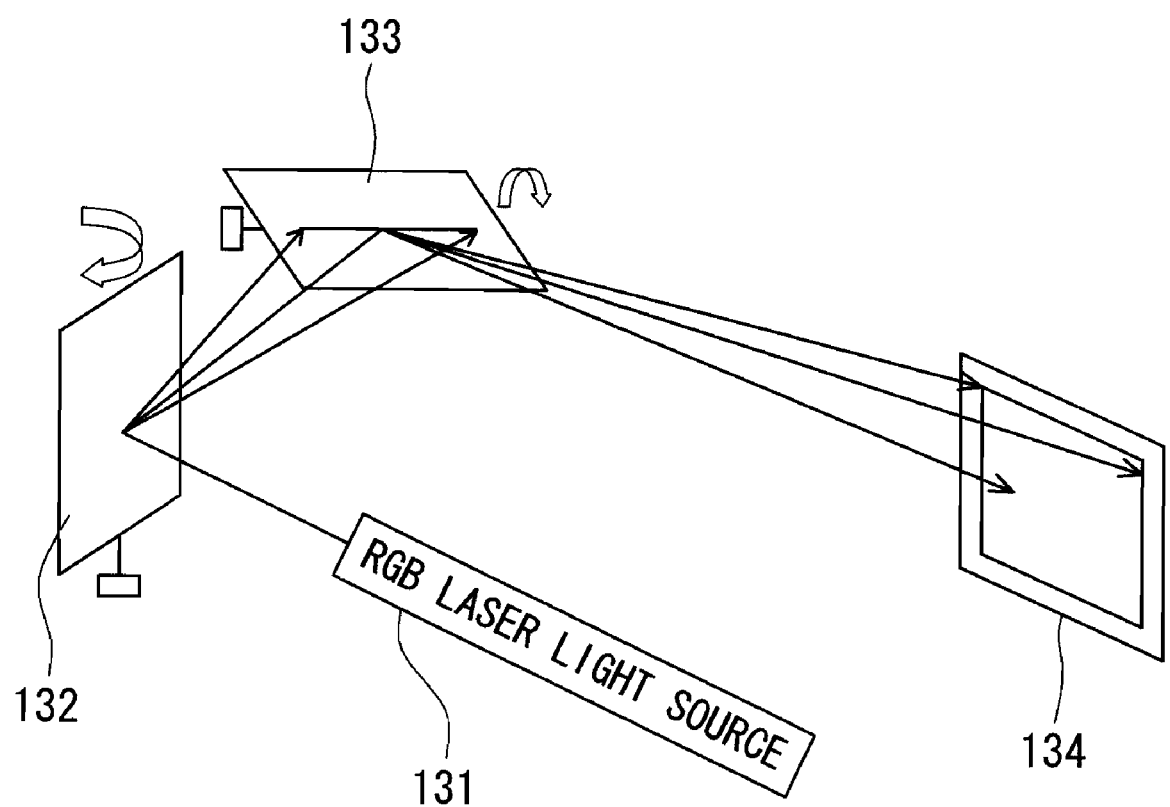
FIG. 13 is a diagram showing a structure of an optical device in a tenth embodiment of the invention.

FIG. 13 shows other example of an optical device. The optical device of this embodiment is a laser display for drawing a two-dimensional image on a screen 134 by scanning laser light emitted from a RGB laser light source 131 by laser light mirrors 132 and 133. The mirrors 132, 133 and the screen 134 are combined to constitute a two-dimensional beam scanning optical system for converting the light from the RGB laser light source 131 into a two-dimensional image.

The RGB laser light source 131 includes a fiber laser of any one of embodiments 1 to 8 for producing green light and blue light, and a semiconductor laser light source for producing red light. The RGB laser light source 131 has a high speed switch function for changing over R, G, and B.

The RGB laser light source 131 can be enhanced in output, and is excellent in output stability. Without using a temperature control element for detecting temperature of the RGB laser light source 131, or by a simple temperature control, a stable output is obtained. Since the RGB laser light source 131 has high beam quality, the scanning optical system can be reduced in size and simplified in structure. As a beam scanning optical system, a small scanning device making use of MEMS (Micro Electro Mechanical Systems) can be utilized. The high beam quality is excellent in focusing characteristic and collimating characteristic, and a small mirror such as MEMS can be utilized. As a result, a scanning type laser display can be realized.

The RGB laser light source 131 may be also composed of a fiber laser for emitting green light, and semiconductor laser light sources for emitting red light and blue light, respectively.

Embodiment 11

FIG. 14 shows further other example of an optical device. FIG. 14A is a side view of a display device, and FIG. 14B is a top view thereof. The optical device of this embodiment is the display device having a fiber laser shown in embodiment 1. The fiber laser is used for backlight of a liquid crystal.

The display device of the embodiment includes an image conversion optical system for converting light from the fiber laser into a two-dimensional image. The image conversion optical system includes, as shown in FIG. 14A, a waveguide plate 141 for guiding laser light, a diffusion plate 142 provided at the backside of the waveguide plate 141, for properly scattering the guide light of the waveguide plate 141 to emit a part of the guide light to the surface side of the waveguide plate 141, a filter 143 provided on the surface of the waveguide plate 141, for transmitting the selected wavelength, a liquid crystal display panel 144 provided on the surface side of the filter 143, for converting the laser light passing through the filter 143 into an image, and a polarizer 145 provided on the upside of the liquid crystal display panel 144.

As shown in FIG. 14B, the display device of the embodiment further includes a control unit 146 for driving the display device at the lateral side of the waveguide plate 141, and a pump light source 1 is installed in the control unit 146. A wavelength conversion element 4 is provided at the side face of the waveguide plate 141, and the wavelength conversion element 4 and the pump light source 1 are connected by the solid-state laser fiber 3. A diffusion element 147 is provided in the waveguide plate 141.

The laser light emitted from the pump light source 1 is oscillated by the solid-state laser fiber 3 and the wavelength conversion element 4, and a single polarized light is emitted from the wavelength conversion element 4, that is, laser light 148 converted in wavelength to green light in the embodiment. The laser light 148 emitted from the wavelength conversion element 4 is diffused in a direction parallel to the principal plane of the waveguide plate 141 by the diffusion element 147.

By using a fiber laser as a light source for backlight of the liquid crystal, a display device of high efficiency and high luminance can be realized at high conversion efficiency. Since a wider color range can be expressed by laser light, a display device excellent in color reproducibility is realized. By using an RGB laser light source having the fiber laser, R, G and B can be generated simultaneously from a single light source, and the structure can be simplified.

The display device of this embodiment includes the fiber laser of embodiment 1, but the fiber laser in anyone of embodiments 1 to 8 can be used similarly.

Embodiment 12

FIG. 15 shows another example of the display device having the fiber laser of embodiment 1. FIG. 15A is a side view of the display device, and FIG. 15B is a top view thereof. The display device of this embodiment includes a plurality of pump light sources 1. The plurality of pump light sources 1 are arranged at the backside of the liquid crystal display panel 144 and spaced from each other at a specified spacing distance. Other structure is same as in embodiment 11.

The liquid crystal display panel 144 has a relatively large area, and the pump light sources 1 can be installed at a specified spacing distance at the backside of the liquid crystal display panel 144. Preferably, the plurality of pump light sources 1 are spaced by about 10 mm or more. As a result, thermal interference of adjacent pump light sources 1 can be reduced substantially. The pump light sources 1 are small in luminous area, and by suppressing the power consumption of each light source to 2 W or less, preferably 1 W or less, thermal interference of adjacent pump light sources 1 can be reduced substantially. Thus, by arranging the plurality of pump light sources 1 at the backside of the liquid crystal display panel 144 away from each other, and by suppressing the power consumption of each pump light source 1 to about 1 W, the heat release effect is enhanced, and the operating temperature of the pump light sources 1 can be kept under 60 degrees C. Hence the pump light sources 1 can be driven under air cooling, and a high reliability is obtained.

The display device of this embodiment includes the fiber laser of embodiment 1, but the fiber laser in any one of embodiments 1 to 8 can be used similarly.

In embodiments 9 to 12, the optical device is the laser display or the display device, but the optical device may be also an optical disk device or a measuring device. In the optical disk device, as the writing speed tends to be higher, the laser output is demanded to be enhanced. Further, the laser light is demanded to have focusing characteristic of diffraction limit, and single mode is essential. The optical device of the invention has high output and high coherence, and is hence applicable to an optical disk device and others.

In the foregoing embodiments, the fiber laser is used in the laser display or as a backlight of the liquid crystal display panel, but not limited to these examples, the fiber laser can be used as a light source for illumination. Since the fiber laser is high in conversion efficiency, electro-optical conversion of high efficiency can be realized. By using the fiber, light can be transmitted to a remote place at low loss. By generating light at a specific place and transmitting light to a remote place, the room can be illuminated by central generation of light. The fiber laser can be coupled with the fiber at low loss, and it is effective for distribution of light.

INDUSTRIAL APPLICABILITY

The fiber laser of the invention can realize a high output of green and blue laser light in a simple structure, and is useful for a laser display, a backlight of a liquid crystal display panel and the like.

The invention claimed is:

1. A fiber laser comprising:
a solid-state laser fiber doped with a rare earth element;
a pump light source that excites the solid-state laser fiber;
a reflective element having wavelength dependency; and
a wavelength conversion element arranged at an output side of the solid-state laser fiber away from the reflective element at a specified distance along the solid-state laser fiber,
wherein an end face of the wavelength conversion element is inclined to an optical axis, and the wavelength conversion element has birefringence, and
wherein the wavelength conversion element is a uniaxial nonlinear optical crystal, the end face of the wavelength conversion element is inclined to incident light from the solid-state laser fiber, the propagation direction of the incident light is nearly orthogonal to the C-axis of the nonlinear optical crystal, and the end face is parallel to the C-axis of the nonlinear optical crystal.

2. The fiber laser according to claim 1, wherein the reflective element is a grating fiber.

3. The fiber laser according to claim 1, wherein the wavelength conversion element includes a reflective element.

4. The fiber laser according to claim 1, wherein the solid-state laser fiber is a polarization preserving fiber.

5. The fiber laser according to claim 1, further comprising a second solid-state laser fiber arranged at the output side of the wavelength conversion element.

6. The fiber laser according to claim 1, further comprising a grating fiber arranged at the output side of the wavelength conversion element.

7. The fiber laser according to claim 1, wherein the end face of the wavelength conversion element satisfies the Brewster angle condition with respect to light emitted from the solid-state laser fiber.

8. The fiber laser according to claim 1, wherein the wavelength conversion element has a periodic polarization inverting structure.

9. The fiber laser according to claim 1, further comprising a prism arranged at the output side of the wavelength conversion element.

10. The fiber laser according to claim 1, further comprising a second wavelength conversion element arranged at the output side of the wavelength conversion element.

11. The fiber laser according to claim 1, wherein the solid-state laser fiber contains at least any one of Yb, Er, Nd, Pr, Cr, Ti, V, and Ho.

12. The fiber laser according to claim 1, wherein the wavelength conversion element is any one of $LiNbO_3$ doped with Mg, $LiTaO_3$ doped with Mg, and $KTiOPO_4$ having periodic polarization inverting structure, $LiNbO_3$ doped with Mg and having stoichiometric composition, and $LiTaO_3$ doped with Mg and having stoichiometric composition.

13. The fiber laser according to claim 1, wherein, in the nonlinear optical crystal, the electric field amplitude direction of P-polarization of the incident light is nearly parallel to the C-axis of the nonlinear optical crystal.

14. The fiber laser according to claim 1, wherein
the wavelength conversion element is an uniaxial nonlinear optical crystal,
the end face of the wavelength conversion element is inclined to incident light from the solid-state laser fiber,
the propagation direction of the incident light is nearly orthogonal to the C-axis of the nonlinear optical crystal in the wavelength conversion element, and
the end face is inclined to the C-axis of the nonlinear optical crystal.

15. The fiber laser according to claim 14, wherein, in the nonlinear optical crystal, the electric field amplitude direction of S-polarization of the incident light is nearly parallel to the C-axis of the nonlinear optical crystal.

16. The fiber laser according to claim 14, wherein an angle of the end face of the wavelength conversion element and the incident light is close to a Brewster angle.

17. The fiber laser according to claim 1, wherein the wavelength conversion element has an end face which is nearly vertical to the X-axis of the nonlinear optical crystal.

18. The fiber laser according to claim 14, wherein the wavelength conversion element has an end face which is nearly vertical to the X-axis of the nonlinear optical crystal.

19. An optical device comprising:
a fiber laser according to claim 1; and
an image conversion optical system that converts light from the fiber laser into a two-dimensional image.

20. The optical device according to claim 19, wherein the image conversion optical system is a two-dimensional beam scanning optical system.

21. The optical device according to claim 19, wherein the image conversion optical system is a two-dimensional switch.

22. The optical device according to claim 19, wherein
the fiber laser generates a green light, and
the optical device further comprises a semiconductor laser light source that generates a red light and a blue light, and
the image conversion optical system converts light from the fiber laser and the semiconductor laser light source into a two-dimensional color image.

23. The optical device according to claim 19, wherein
the image conversion optical system includes:
a waveguide plate that causes light emitted from the fiber laser to propagate; and
a liquid crystal display panel.

24. The optical device according to claim 23, further comprising:
a control unit that controls the liquid crystal display panel,
wherein the wavelength conversion element is arranged at the lateral side of the waveguide plate, and
the pump light source is arranged in the control unit.

25. The optical device according to claim 23, wherein
the pump light source comprises a plurality of laser light sources, and
the plurality of laser light sources are arranged on a rear face of the liquid crystal display panel and spaced from each other at a specific distance.

* * * * *